July 25, 1967 — J. E. GREEN — 3,332,572

SEALING PLUG

Filed Oct. 14, 1964

INVENTOR
JOHN E. GREEN.
BY Walter S. Jones
ATTORNEY

3,332,572
SEALING PLUG
John Edward Green, Warsop, England, assignor to United-Carr Incorporated, Boston, Mass., a corporation of Delaware
Filed Oct. 14, 1964, Ser. No. 403,793
Claims priority, application Great Britain, Oct. 14, 1963, 40,494/63
5 Claims. (Cl. 220—25)

This invention relates to a two-part sealing plug for assembly in an aperture in a support.

According to the present invention, each of the two parts of the sealing plug is formed of resilient material, for example, synthetic plastics, and each includes a shank closed at one end which end is provided with a resilient radial flange, the shank of one part being hollow and having a projection on its inner surface, and the shank of the other part being of less diameter than and being insertable into the hollow shank of the said one part and having a projection on its outer surface for co-operative engagement with the projection on the hollow shank.

The radial flanges extend in the direction of the respective shanks at an angle thereto. The two parts of the plug are adapted to be assembled with one another by inserting the shank having the external projection into the hollow shank so that the said projection snaps over that on the inner wall of the hollow shank. The assembled parts are then inserted axially into an aperture in the support, the radial flange flexing inwardly to permit this. When inserted, the assembled shanks will be located in the aperture and the resilient flanges will resiliently engage the respective opposite faces of the support surrounding the aperture so as to seal the latter against the entry of dirt or moisture.

To enable the invention to be fully understood, it will now be described, by way of example, with reference to the accompanying drawings in which.

Figure 1:
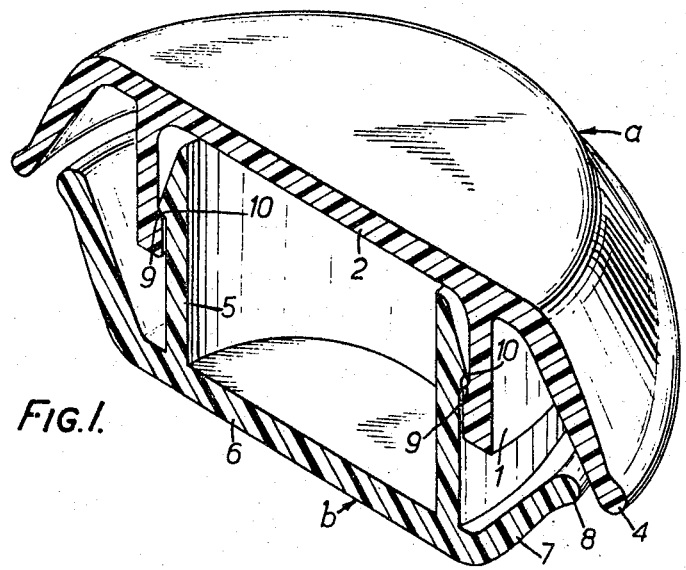
FIGURE 1 is a sectional perspective view of a sealing plug according to one embodiment of the invention.

As shown in the accompanying drawings, the sealing plug comprises two parts $a$, $b$, each comprising a moulding of synthetic plastics material. The part indicated by $a$ comprises a hollow cylindrical shank 1 closed at one end by a wall 2, the peripheral edge of the latter having an integral extension forming an annular radially extending flange 3. As shown, the flange extends in the general direction of the shank and makes an acute angle with the cylindrical wall of the latter. As shown, the free end of the flange terminates at a plane containing the free end of the hollow shank, but if desired, it may terminate just short of or just beyond the said plane. The peripheral free edge of the flange is thickened to form a bead 4.

The other part $b$ is also formed with a hollow cylindrical shank 5 closed at one end by a wall 6, the peripheral edge of the latter having an integral extension forming an annular radially extending flange 7, the peripheral free edge of which is thickened to provide a bead 8. The flange 7 extends in the general direction of the shank 5 and makes an acute angle with the cylindrical wall of the shank. The shank 5 has a greater axial length than the shank 1, and the flange 7 terminates at a plane which bisects the shank approximately midway of its axial length.

The inner wall of the shank 1 is formed with a projection comprising an annular shoulder 9, and the outer wall of the shank 5 is formed with a projection comprising an annular shoulder 10, the shoulders being so disposed that when the shank 5 is inserted into the shank 1, the shoulder 10 will snap over the shoulder 9 and the two shoulders will co-operate to secure the parts of the plug in assembly.

The plug is adapted to be assembled with a support such as 11 having an aperture 12. The two parts are assembled with one another as shown in FIGURE 2 of the accompanying drawings and the plug presented to the aperture 12, with the wall 6 of the part $b$ facing the aperture which has a cross-sectional area greater than that defined by the shank 1 but less than that defined by the peripheral free edges of the respective flanges 3 and 7.

It will be noted that the flange 7 being of smaller diameter than the flange 3 is disposed within the latter when the parts are assembled with one another.

Figure 2:
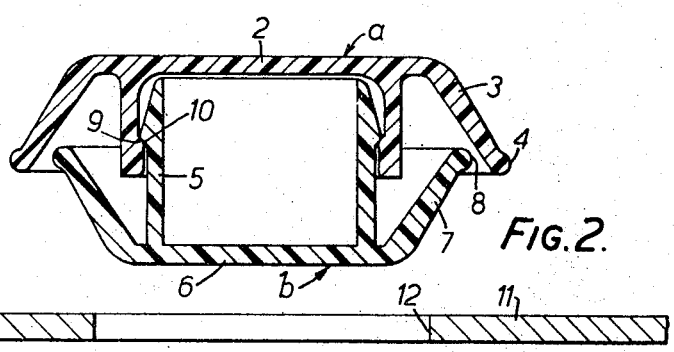
FIGURE 2 is a sectional side view of the plug about to be assembled with an apertured support.
Figure 3:
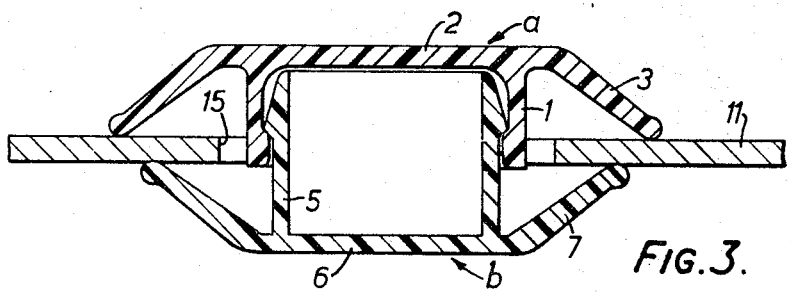
FIGURE 3 is a sectional side view of the plug assembled with the support.

The plug is moved from the position indicated in FIGURE 2 axially into the aperture 12, the flange 7 flexing inwardly to permit this, and after insertion, the flange will automatically flex outwardly to its normal position to overlie the portion of the support surrounding the aperture. The flange 3 will also overlie the portion of the opposite face of the support surrounding the aperture, and accordingly the free edges of the flanges will resiliently engage the respective faces of the support to seal the aperture against the entry of dirt or moisture.

While it is preferred that the shank 5 which extends into the shank 1 is hollow, it could be of solid form.

It is not essential that the plug parts be pre-assembled before insertion into the aperture, and in some cases they could be separately applied from opposite faces of the support, the shanks being inter-engaged during the operation of insertion.

Each part preferably comprises a one-piece moulding of synthetic plastics material, but they could be made of rubber.

The sealing plug is particularly applicable for sealing apertures in plates forming part of a motor vehicle body. In the manufacture of such bodies, apertures are normally made in parts of the structure to allow paint or rust preventive liquids to drain away when the body is immersed in tanks containing liquid. In later stages of the manufacture, these apertures are used as jig location points with the result that their edges become distorted making it impossible for them to be effectively sealed by normal plugs. With the plug according to the present invention, sealing is effected by the radial flanges engaging surfaces of the support, and accordingly an effective seal is provided irrespective of whether the edges of the apertures themselves are jagged, deformed or of irregular shape.

I claim:

1. A two-part sealing plug for assembly in an aperture in a support wherein each of the two parts of the plug is formed of resilient material, for example, synthetic plastics, and each includes a shank closed at one end which end is provided with a resilient radial flange, the shank of one part being hollow and having a projection on its inner surface, and the shank of the other part being of less diameter than and being insertable into the hollow shank of the said one part and having a projection on its outer surface for co-operative engagement with the projection on the hollow shank.

2. A two-part sealing plug according to claim 1, wherein the projections on the shanks comprise annular shoulders respectively positioned for co-operative engagement when the shank of the said other part is inserted into the hollow shank of the said one part.

3. A two-part sealing plug according to claim 1 wherein the shank of the said other part is also hollow.

4. A two-part sealing plug according to claim 1, wherein the radial flanges on each shank extend at an obtuse angle to the axis of the respective shank such that when the two parts are assembled with one another and positioned in an aperture in a support, the flanges respectively engage opposite faces of the support.

5. An assembly comprising an apertured support having a two-part sealing plug according to claim 1 assembled in the aperture, the shanks being disposed in the aperture with the shank of the other part extending into the shank of the said one part and secured thereto by said co-operating projections or shoulders, and the radial flanges resiliently engaging portions of the opposite faces of the support surrounding the aperture so as to seal the latter against the entry of dirt or moisture.

References Cited

UNITED STATES PATENTS

| | | | |
|---|---|---|---|
| 2,249,381 | 6/1941 | Gustafson | 220—25 |
| 3,115,981 | 12/1963 | Darmstadt et al. | 215—48 |

THERON E. CONDON, *Primary Examiner.*

JAMES B. MARBERT, *Examiner.*